US006310886B1

(12) United States Patent
Barton (10) Patent No.: US 6,310,886 B1
(45) Date of Patent: Oct. 30, 2001

(54) METHOD AND APPARATUS IMPLEMENTING A MULTIMEDIA DIGITAL NETWORK

(75) Inventor: James M. Barton, Los Gatos, CA (US)

(73) Assignee: TiVo, Inc., Alviso, CA (US)

( * ) Notice: Subject to any disclaimer, the term of this patent is extended or adjusted under 35 U.S.C. 154(b) by 0 days.

(21) Appl. No.: 09/135,753

(22) Filed: Aug. 18, 1998

Related U.S. Application Data
(60) Provisional application No. 60/057,155, filed on Aug. 28, 1997.

(51) Int. Cl.[7] .................................................. H04J 3/02
(52) U.S. Cl. ............................................ 370/462; 370/443
(58) Field of Search .................................. 370/432, 463, 370/322, 348, 419, 420, 442–444, 449, 461, 462; 340/825.08, 825.14, 825.15, 825.2, 825.21, 825.22

(56) References Cited

U.S. PATENT DOCUMENTS

| | | | |
|---|---|---|---|
| 4,063,220 | 12/1977 | Metcalfe et al. | 340/147 |
| 4,587,650 | 5/1986 | Bell | 370/86 |
| 5,012,469 | 4/1991 | Sardana | 370/95.3 |
| 5,295,140 | 3/1994 | Crisler | 370/94.1 |
| 5,381,413 * | 1/1995 | Tobagi et al. | 370/448 |
| 5,446,735 * | 8/1995 | Tobagi et al. | 370/445 |
| 5,590,131 * | 12/1996 | Kabatepe | 370/461 |
| 5,619,695 * | 4/1997 | Arbabi et al. | 709/100 |
| 5,680,589 * | 10/1997 | Klingman | 395/500.44 |
| 5,695,400 * | 12/1997 | Fennell, Jr. et al. | 463/42 |
| 5,768,681 * | 6/1998 | Dan et al. | 725/95 |
| 5,771,350 | 6/1998 | Kim | 395/200.8 |
| 5,915,094 * | 6/1999 | Kouloheris et al. | 345/327 |
| 5,926,457 * | 7/1999 | Feng | 370/230 |
| 6,032,000 * | 2/2000 | Lin | 710/6 |
| 6,115,390 * | 9/2000 | Chuah | 370/443 |
| 6,185,360 * | 2/2001 | Inoue et al. | 386/46 |

FOREIGN PATENT DOCUMENTS

| | | | |
|---|---|---|---|
| 569 651 | 4/1995 | (EP) | H01H/69/00 |
| WO 97/39556 | 10/1997 | (WO) | H04L/12/64 |

OTHER PUBLICATIONS

S. Radhakrishnan, S.V. Raghaven, Ashok K. Agrawala; A flexible traffic Shaper for high speed Networks: Design and Comparative Study with Leaky Bucket; 1996; Computer Networks and ISDN systems 28.

Wenge Ren. Kai–Yeng Siu. Hiroshi Suzuki; Masayuki Shinihara; Multipoint–to–multipoint ABR service ATM; 1998; Computer Netowrks and ISDN Systems 30.

M. Ajmone Marsan, F. Saluta; Fairness and Efficiency of Slot Reuse Algorithms in DQDM MANS; 1997; Compute Communications 20.

Worsley, D. and T. Ogunfunmi, Isochronous Ethernet—An ATM Bridge for Multimedia Networking, 1997, IEEE.

Moorwood, A. Implementing a Multimedia Capable Netowrk Using ATM and IEEE, 1994, Transport Technologies.

* cited by examiner

Primary Examiner—Chau Nguyen
Assistant Examiner—Jasper Kwoh
(74) Attorney, Agent, or Firm—Michael A. Glenn; Kirk Wong (57) ABSTRACT

A method and apparatus for efficiently managing the allocation of available data capacity on a physically shared digital network among devices connected to that network is disclosed. Also disclosed is a method and apparatus for managing the ongoing timely movement of data on the shared network such that precise long-term data rates are achieved between attached devices with minimal additional buffering. The invention further comprises a method and apparatus which allows the use of any remaining network capacity for non time-critical data movement without the need for centralized access management.

52 Claims, 4 Drawing Sheets

METHOD AND APPARATUS IMPLEMENTING A MULTIMEDIA DIGITAL NETWORK

This application claims benefit of provisional application 60/057,155, filed Aug. 28, 1997.

BACKGROUND OF THE INVENTION

1. Technical Field

The invention relates to data communications networks. More particularly, the invention relates to an improved method and apparatus for managing the allocation of data capacity on a physically shared network segment among devices attached to that segment, where the shared access method uses Time Division Multiple Access (TDMA) techniques within a baseband channel.

2. Description of the Prior Art

TDMA networks are described in R. Metcalfe, D. Boggs, C. Thacker, B. Lampson, *Multipoint data communication system with collision detection*, U.S. Pat. No. 4,063,220 (Dec. 13, 1977). The Metcalfe et al patent is a seminal teaching, presently being referenced in 186 other patents. Examples of such networks are traditional Ethernet, IEEE Standard 802.3 for coaxial cable, and IEEE Standard 802.11 for local area wireless networking. Additionally, new technologies are being developed which provide Ethernet-like characteristics on other physical mediums, such as Category 1 or 2 unshielded twisted pairs or AC power lines.

A feature of most emerging shared-capacity technologies is that the achievable transmission rate between nodes on the network varies based on such factors as the node itself, topology of the network, and electrical noise. Such networking is often called rate-adaptive networking because each node adapts it's basic transmission parameters to achieve the best rate to some other node. Unlike previous shared-capacity networks, it is not possible to describe the maximum bandwidth of the network, or to predict a priori the achievable data rate between any two nodes.

As used herein, the generic term "ethernet" refers to all such networks. Fundamental characteristics of an ethernet are:

Σ A number of nodes, each free to choose to transmit at any time;

Σ An access-checking scheme, termed Carrier Sense Multiple Access (CSMA), in which a node checks if the shared network is in use before transmitting;

Σ Collision Detection (CD), in which a node monitors the shared network as it is transmitting, to detect if another node began transmitting simultaneously, thus garbling the data; and Σ A random backoff algorithm which attempts to de-synchronize nodes which have sent colliding packets by having each node wait a (short) random amount of time before retrying the transmission.

As used herein, the generic term "streaming media" refers to long-term, continuous flows of digital information that must achieve a constant data rate measured over short periods. For example, consider a network device which accepts network packets containing compressed audio data, and then uses that data to produce the corresponding audio signals that drive a speaker. The device has a packet buffer of some fixed size, and it is the responsibility of the sending device to insure that packets are delivered in a timely way such that the buffer never becomes empty, and that there is always room in the buffer for the next packet sent. This implies that each packet in the stream must be sent at a constant interval, said interval being based on the transmission speed, buffer size, and rate at which the audio data are consumed. This interval may vary over short periods depending on the size of the receiving buffer. This implies that larger buffers can smooth the effects of contention for the shared network as long as sufficient network bandwidth is available to achieve the long-term delivery rate.

Large buffers are expensive in many ways, so it is desirable to use methods of transmitting streaming media that minimize the required receiving buffer size. For example, if the audio device described earlier is two-way, the use of large buffers results in a time-shift between the incoming and outgoing streams which is easily detectable and usually annoying. The physical cost and implementation of such buffers can become significant for inexpensive devices, such as portable phones.

As used herein, the generic term "on-demand" refers to other digital information flows on the network. For example, data fetched by an Internet Web browser is usually formatted as packets of TCP data, but there is no time-sensitivity to how the packets actually flow through the network. Buffers for such traffic are assumed to be large and carefully managed in software. Ideally, it is desirable to mix streaming media and on-demand traffic arbitrarily on the network to achieve the most efficient use of the network bandwidth. However, the two types of traffic are counter-posed in requirements for the underlying network.

There have been many attempts in the past to design methods and apparatus to balance the requirements of these two types of traffic. The simplest of these networks is one in which the available network bandwidth is permanently divided between streaming media and on-demand traffic. Such networks are sometimes referred to as isochronous networks. In such networks, a central bandwidth allocation manager handles requests for streaming media allocations. A serious flaw with such systems is that the bandwidth division is fixed, thus limiting both on-demand performance and the maximum bandwidth stream that can be supported. The usual result is inefficient utilization of the network bandwidth and limited performance.

A great deal of work has gone into the creation of mixed-traffic management streams on token-ring networks. Much of this work has been codified by IEEE Standard 802.5. These schemes rely on physical or logical token-passing schemes for managing access to the shared network. J. Bell, *Method of Simultaneously Transmitting Isochronous and Nonisochronous Data On A Local Area Network*, U.S. Pat. No. 4,587,650 (May 6, 1986) discloses a general description of how this traffic management is handled on a token-ring network.

Token passing schemes have serious weaknesses that preclude their use in many environments. These include a requirement that all nodes have the same bandwidth to all other nodes; each node must implement complex recovery schemes to reconstruct capacity allocations and prioritization if any node fails; each node must implement a complex suite of protocols to insure reliable operation, thus increasing the cost of a node and lowering it's reliability (from both hardware and software failures); and passing the token through intermediate, non-transmitting nodes adds latency and decreases capacity. Token-ring networks have fallen into technical disfavor versus ethernet networks in many applications for these reasons.

Another set of attempts to address these problems involve the use of slotted protocols, where the bandwidth of the shared media is explicitly subdivided into equal-length slots.

K. Crisler, M. Needham, *Method for Multi-Purpose Utilization of Resource in a Communication System*, U.S. Pat. No. 5,295,140 (Mar. 15, 1994) and K. Sardana, *Adaptive Hybrid Multiple Access Protocols*, U.S. Pat. No. 5,012,469 (Apr. 30, 1991) contain a good overview of these methods, which may be generally referred to as reservation protocols. In these methods, it is assumed that each node has sufficient capability to participate in a contention-based reservation protocol, resulting in long-term assignment of shared network capacity to particular nodes. A general feature of these methods is the complexity of the reservation protocol, which increases the cost to implement any given node and reduces the node's reliability. Additionally, these protocols require each node to advertise it's desire for the resources of the network continuously to maintain it's reservation. This is done to allow quick recovery from failed nodes, but it consumes additional network bandwidth that might be more gainfully used and increases node cost. Finally, the overall capacity of the network is lowered because it is not always possible to fill each fixed-size slot to capacity.

Other schemes have been proposed for this purpose which involve significant differences from the basic operation of an ethernet network. These schemes are not considered here because they involve proprietary techniques, specialized architectures, or hardware which is not commercially viable. A primary example of these other schemes are those developed for Asynchronous Transfer Mode (ATM) networks, where each node has a dedicated path to a central controller.

It would be desirable to create a facility for managing any ethernet-style network to handle both constant-rate streaming media and on-demand traffic, while achieving maximum possible efficiency and performance of the network. Many current efforts in this field center on extensions to the Internet Protocol (IP) to allow dynamic provisioning of bandwidth. These extensions, collectively named RSVP (Reservation Protocol), are designed to operate in a complex, heavily routed infrastructure where there is no a priori knowledge of the network configuration or available bandwidth, and where it is not possible to rely on a central controller. This leads to undesirable features in a simpler environment, such as a single shared network segment: large code size, slow setup and tear down of streams, and a requirement that every device support RSVP and all related protocols.

However, a chief flaw of RSVP in a single shared network environment is that it is a peer-to-peer protocol, and assumes intermediate routers are simply allocating and deallocating bandwidth within their backplane and at the network ports, such that notions of total available bandwidth and managed reservations are disallowed. In an environment where the devices share a physical network and the bandwidth between any two devices is arbitrary, the lack of such knowledge leads to conflicts between devices. This is a key issue, one as yet unresolved by any standard protocol specification.

It would be desirable to provide a method and apparatus that addresses the weaknesses of prior art in this field (as described above) within any ethernet-style network which may have varying maximum bandwidths between nodes on the network. It would also be desirable if such methods were extended to a small number of such segments interconnected by one or more routing agents.

SUMMARY OF THE INVENTION

The method and apparatus described herein addresses the problems of bandwidth allocation on a shared digital network, using a unique, novel, and simple mechanism for scheduling streaming media and on-demand transmissions such that efficient use of the network is achieved, while maintaining stable data delivery rates.

One embodiment of the invention provides a simple means by which any device can present a sequenced stream of packets to a network for transmission and have those packets sent at precisely specified times. This function is implemented with minimal additional hardware in each network node, thereby reducing or eliminating added cost.

Another embodiment of the invention allows nodes to transmit on-demand packets on the network without disrupting the ongoing flow of streaming data, and without requiring the intervention of any centralized controller or the use of a token-passing or slotted reservation scheme.

Another embodiment of the invention provides for maximal efficiency in the transmission of on-demand data by allowing nodes to contend for access to the shared network during times when the network is available for on-demand data. At the same time, any conflict that might arise if all nodes were not able to send their packets during one of those periods is avoided.

DETAILED DESCRIPTION OF THE INVENTION

This invention relates generally to an improved method and apparatus for managing the allocation of data capacity on a physically shared network segment among the devices attached to that segment, where the shared access method uses Time Division Multiple Access (TDMA) techniques within a baseband channel.

Figure 1:
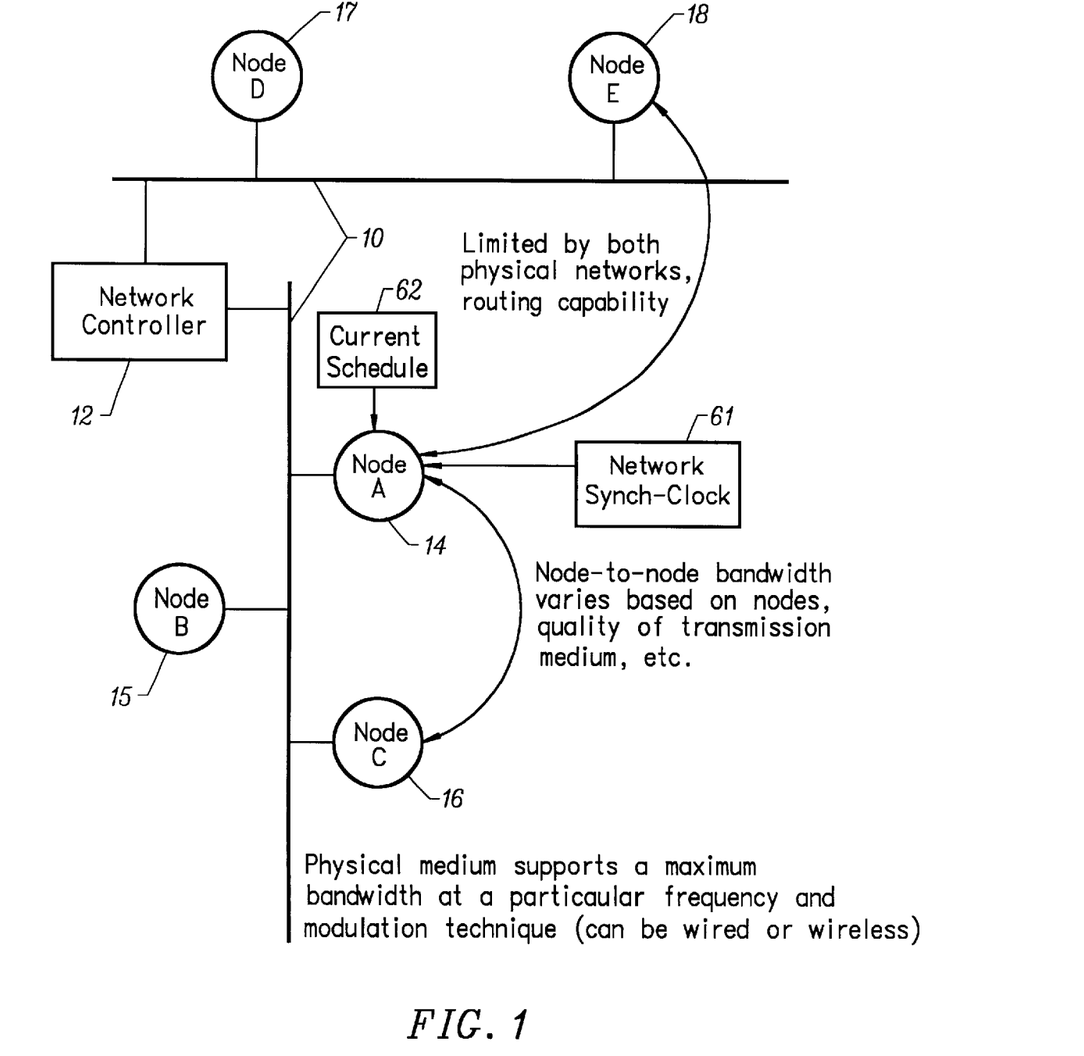
FIG. 1 is a block schematic diagram showing a general model of a rate-adaptive broadcast packet network in which transmission rate and signal quality may vary between nodes.

FIG. 1 is a block schematic diagram showing a general model of a rate-adaptive broadcast packet network in which transmission rate and signal quality may vary between nodes according to the invention. The method and apparatus of this invention concern the enhancements, modifications, and methods required to implement a streaming media service which operates in parallel with on-demand packet-based services on a shared-media ethernet style network 10 which may include a network controller 12, while providing reliable, glitch-free delivery of the streaming media between various network nodes 14–18, and while maximizing the efficient use of the physical transmission medium.

Figure 2:
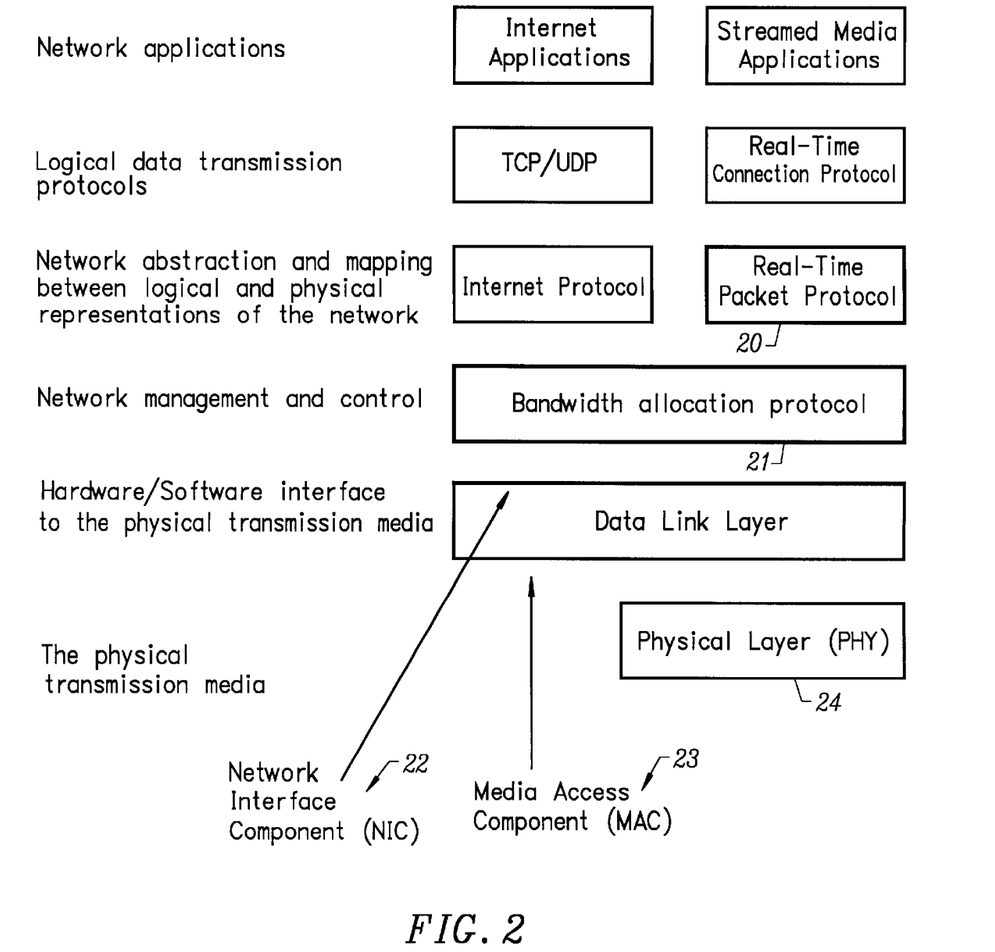
FIG. 2 is a block schematic diagram showing an abstract working model on which the herein described method and apparatus are used according to the invention.

FIG. 2 is a block schematic diagram showing a typical abstract networking model on which the herein described method and apparatus are used according to the invention. In FIG. 2, bold lines indicate specific areas which are addressed by the method and apparatus disclosed herein, i.e. real-time packet protocol 20, a bandwidth allocation protocol 21, and a Network Interface Component (NIC) 22.

The method and apparatus described herein:

Σ Significantly reduce the required complexity and cost of each network node over existing techniques;

Σ Correctly manage a shared digital network where the bandwidth between any two nodes may vary, perhaps greatly, from the bandwidth achievable between any other pair of nodes;

Σ Replace the notion of a slotted allocation scheme with one which provides for arbitrary choice of packet size and transmission times;

Σ Eliminate the need for a reservation protocol for on-demand packet transmissions;

Σ Provide fault tolerance features which allow the continued correct operation of remaining nodes attached to the network in the face of one or more node failures; and Σ Provide fault-recovery features which allow the transparent addition of new or repaired nodes to the shared network without disturbing ongoing streaming media transmissions.

This description is broken into four separate parts:

1. Modifications to common Network Interface Component (NIC) behavior which provide greater control over how and when data are presented to the physical transmission medium.

2. A method which provides for the distributed management of available bandwidth on a Local Area Network (LAN) to achieve maximal use of the physical transmission medium, while meeting standards for Quality-of-Service (QOS) for streaming media.

3. Methods for the automatic handling of node additions or deletions from the network due to node failure or the introduction of new nodes.

4. A preferred embodiment of a method for performing the distributed reservation of bandwidth on the shared transmission medium which is both reliable and simple to implement.

Network Interface Component (NIC) Modifications

Standard practice NIC hardware combines three functions:

1. Physical Layer (PHY) 24 (FIG. 2), which handles the actual media and which varies depending on the media type. This application contemplates no new or unique methods or techniques in regards to physical network media.

2. Media Access Control (MAC) 23, which is responsible for obtaining control of the network transmission medium, and properly framing and transmitting a packet of data on that medium. The methods of this application apply specifically to networks which use the Carrier Sense Multiple Access with Collision Detection (CSMA/CD) protocol which is the standard for contention-based broadcast (i.e. ethernet) networks. This invention contemplates no new or unique methods or techniques in regards to media access control.

3. Sequencing and control, which concerns for example retrying transmission if the carrier is busy or conflicts occur; moving packets between local buffers and host memory as required; and interacting with the host to handle control operations properly, such as interrupts, or starting and stopping the NIC. In general, the host provides packets for transmission along with certain control flags and other data which modify how the NIC processes a packet. The methods and apparatus of this invention apply to this group of functions 22.

Figure 3:
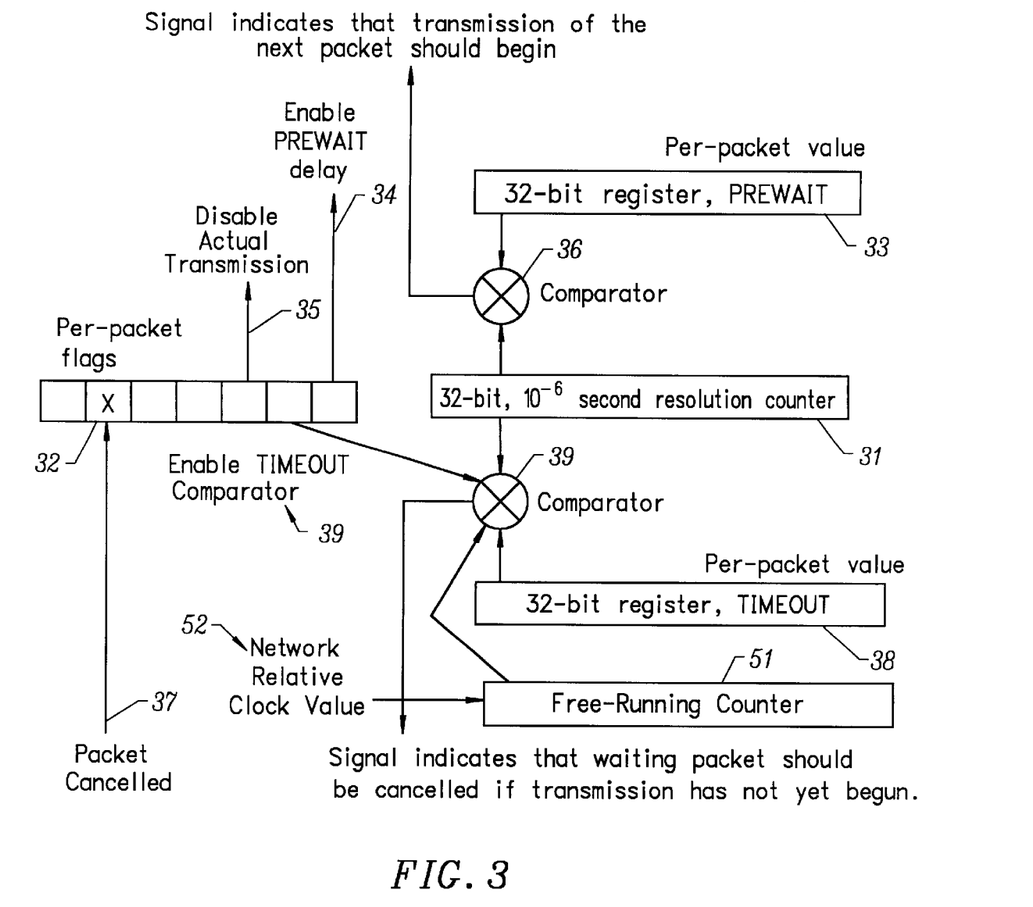
FIG. 3 is a block schematic diagram showing enhancement to a software driver interface for a normal NIC according to the invention.

FIG. 3 is a block schematic diagram showing enhancement to a software driver interface for a normal NIC according to the invention. In particular, FIG. 3 gives a pictorial overview of the additional NIC apparatus supporting the invention. There are the five key elements of this apparatus:

1. The NIC incorporates a free-running counter 31 with at least microsecond resolution, and a suitably long period. This counter may be read or modified by the host processor at any time.

2. Various flags 32 may be set. In response to a flag 34 which may be set individually for each packet, the NIC is required to load a register 33 with a host-specified value, this register being identical in size with (1) above. The NIC is then required to wait, without accessing the transmission media, until the register value matches that of the free-running counter 51. When this occurs, the NIC must transmit the packet (except see (3)). This register is referred to as the PREWAIT register herein.

3. The host may set another flag 35 for each packet indicating that the packet itself should not be transmitted on the media. In this case, the actions of (2) above shall apply, except that when the counter values match (as determined by a comparator 36, the NIC marks the packet done and continues on to the next packet in sequence.

4. In response to another flag 39 which may be set individually for each packet, the NIC is required to load a register 38 with a host specified value, this register being identical in size with (1) above. The NIC then transmits the packet, after waiting until the appropriate time if (2) above is active. The NIC may encounter contention for the transmission media. If the NIC is unable to send the packet before this register value matches that of the free-running counter 51, as determined by a comparator 39, then it ceases attempting to transmit the packet, and indicates that it was not sent by setting the appropriate bit in host memory. If case (3) is active, i.e. the packet was not to be transmitted, the NIC waits until this register matches the value of the free running counter, indicates it has finished with the packet, and continues operation. This register is referred to as the TIMEOUT register herein.

5. The host, on demand, may request that a packet which is waiting for transmission as described in (2) above be canceled. If transmission has not yet begun, the packet flags 37 are marked appropriately, and the NIC stops processing packets. Otherwise, transmission of the packet is completed normally.

Efficient Distributed Rate-Adaptive Media Access Scheduling

Figure 4:
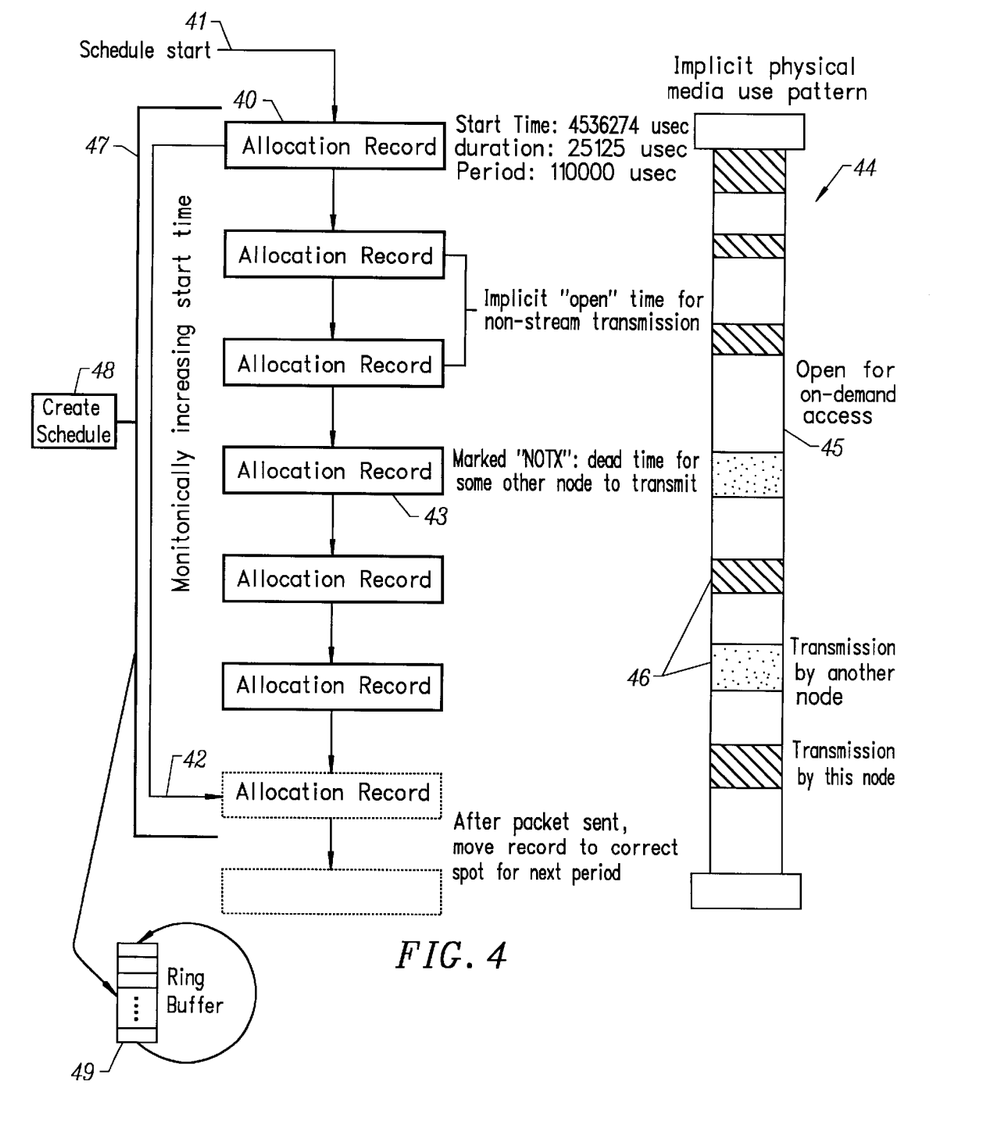
FIG. 4 is a flow diagram showing how schedule data structure maintained in each node describes active streams, bandwidth allocation, and candidate slot for non-stream transmissions according to the invention.

Using the apparatus defined above, it is possible to compute a schedule 48 for the transmission medium 44 indicating when various network devices are permitted to transmit on the medium 44, and to indicate unscheduled portions of the bandwidth 45 which are contended for by the devices. Such a strategy allows the designer to eliminate network contention during periods where scheduled transmissions 46 are taking place. It also allows for limited contention for unscheduled portions of the bandwidth 45, with the ability to stop contention in time for the next scheduled transmission. Taken together, these features create a unique and novel mechanism by which any ethernet-style network can support streaming media delivery. These features are described more fully below.

Standard scheduling algorithms rely on the fact that there is a fixed amount of some quantity (e.g. time, material, processor clock cycles, or IO channel capacity) available, and then use some form of fitting algorithm to distribute this fixed quantity among competing demands. On a rate-adaptive network, this form of scheduling is not possible because each device may communicate at a different rate with any other given device. By implication, this means that there are $2^N$ different combinations, where N is the number of devices on the network, and the total bandwidth of the network is incalculable.

The method described here relies on the observation that while transmission rates are unpredictable on such a network, the time it takes to transmit a block of X bytes between two nodes is solely determined by the achievable bandwidth between those nodes and the size of the block to be transmitted. If an arbitrary scheduling interval is chosen, then it becomes possible to schedule the use of the medium based on the time it takes for each transmission, regardless of the available bandwidth between any two nodes.

FIG. 4 is a flow diagram showing how a scheduling data structure maintained in each node describes active streams, bandwidth allocation, and candidate slots for non-stream transmissions according to the invention Each node on the network is required to maintain a representation of the network schedule locally. Each node is also responsible for setting the free-running counter 51 (see FIG. 3) in the NIC with a network-relative clock value 52 which is periodically broadcast by a selected node. The period of this broadcast is determined by the maximum acceptable clock drift in each node, such that synchronization of each nodes' clock with a central clock is maintained. The schedule consumes very little space. Each scheduled block of time is represented by an allocation record 40, which contains fields describing the network clock time at which the block begins, the duration of time represented by the block, and the re-scheduling period, for continuous, constant-rate streams of data. The schedule may be thought of as beginning at the time <NOW>, and continuing indefinitely into the future. When a scheduled block transmission is completed, and the block represents a constant rate stream of data, the block is re-inserted at the appropriate point in the schedule for sending the next block of data. Once a schedule is started 41, inserting, deleting and moving blocks within the schedule 42 are simple, straightforward operations to one skilled in the art, and implemented in very little memory space.

This method of scheduling use of the shared network is unique, in that there is no fixed-duration schedule nor any notion of the maximum capacity of the network or that this capacity is explicitly divided into fixed-size chunks. It is also unique in that many of the scheduling tasks, such as maintaining the reservation for a streaming media transmission, are distributed and performed on each node in parallel, regardless of the presence or absence of particular nodes.

Allocation records are set up and (eventually) torn down on command from a selected node. A portion of the network schedule is reserved for management overhead, which includes managing allocation records. This reservation is sized for a broadcast bandwidth suitable to reach every device on the network, i.e. it is sized for the device with the lowest available bandwidth. This implies that allocation records can be set up or torn down in every node on the network with a single transmission.

When a node receives an allocation message, it performs the proper operation on it's local copy of the schedule. If the node is not sending the stream of data, it allocates a dead-space record 43, which indicates to the node that it is not to transmit during that period (it can still receive packets).

The NIC apparatus above easily supports this strategy. For each packet, the NIC software driver provides the proper clock values and flag settings (refer to FIG. 3) to cause the packet to be sent at the correct time. Practitioners skilled in the art will recognize that the schedule has a direct correspondence to the typical ring-buffer algorithm used for queuing packets to be sent through a NIC. In fact, one preferred embodiment of the invention combines a buffer and an allocation record into a single data structure, and uses the ring-buffer to hold the schedule (refer again to FIG. 4). A useful discussion of this method can be found in B. Petersen, W. Sherer, D. Brown, L.-C. Lo, *Network interface with host independent buffer management*, U.S. Pat. No. 5,299,313 (Mar. 29, 1994). The NIC enhancements described earlier add a layer of software controlled sequencing and synchronization to the basic NIC behavior.

The following method description using pseudo-code motivates the selection of some additional features of the modified NIC:

```
Begin insertAllocationRecord {
    if (schedule is empty) {
        insert record at start of schedule:
        start NIC;
        return;
    }
    for (each record in the schedule) do {
        if (new record goes before this record) {
            if (this record is first in schedule) {
                stop NIC;
                insert new record;
                start NIC;
            }
            otherwise {
                insert new record;
            }
            return;
        }
    }
    insert record at end of schedule;
} End
```

This algorithm relies on the fact that the NIC has been made synchronous by requiring it to wait until a particular clock value before transmitting a packet. Therefore, the first record in the schedule always represents a packet in the NIC waiting for transmission. If a new allocation record is to be sent at a time between <NOW> and when the waiting packet would be sent, then the waiting packet must be canceled, the new record inserted, and the NIC restarted with the new packet.

For allocation records which reserve space for other nodes to transmit, the NIC software driver indicates that a packet should not actually be sent when the proper clock value is reached; instead the NIC waits until the contention timeout value is reached, and then continues processing the next packet.

On-demand Transmissions

An object of this method is to combine time-sensitive (i.e. streaming media) transmission with on-demand data transmission, such that packets involved in synchronous data transmissions are unaffected by other traffic, while providing the maximum possible throughput for on-demand data.

This method provides for this capability through simple modifications of the basic scheduling method and apparatus. Note that all network transmissions are of known duration because packet size and bandwidth between source and destination nodes is known. When the NIC software driver on a particular node is presented with a packet to be sent, it scans it's local copy of the schedule 47, inserting the packet 48, 43 into the first unscheduled space 45 big enough to hold it. The method for inserting streaming media packets is modified, such that if a conflict occurs between a streaming media and an on-demand packet, the streaming media packet is always scheduled into that space. A previously scheduled on demand packet is deleted from the schedule and re-inserted in the first available slot in this case, having been replaced in the schedule by the streaming media packet. Ordering of transmission of asynchronous packets from different sources may not be maintained because they vary in size, and a particular available transmission window may be too small for a given packet, which is expected behavior from an Ethernet style network. However, ordering of packets from the same source is maintained by this method.

It was shown earlier how the scheduling mechanism eliminates network contention for streaming media packets using a shared clock. Contention for on-demand packet space has not been addressed. Contention can, of course, be eliminated by reserving on-demand transmission space as well. For instance, each node can be guaranteed a slice of bandwidth, or a reservation algorithm could be implemented.

Reservation of on-demand bandwidth is unappealing. The nature of on-demand bandwidth is truly bursty and demand-driven. Consider the Internet Protocol suite (TCP/IP). IP has certain low-level maintenance protocols, such as ICMP, RIP, ARP and others which involve rare, single-packet transmissions. TCP is designed to work well between widely scattered nodes on the Internet, therefore throughput varies dramatically and packets arrive at random intervals. Dedicating bandwidth for such traffic is both wasteful and performance-limiting: wasteful because the bandwidth is mostly unused, and performance-limiting because the dedicated bandwidth is, by necessity, small. Reservation protocols have far too much overhead for small-scale transmissions and are ideally suited for streaming media, rather than on-demand, scheduling.

This method maintains the contention-based model of all ethernet-style networks for on-demand transmission. Thus, two or more nodes may choose the same interval in which to send their data. The probability of collisions is quite small on a moderately loaded network, so this is a good choice. Problems occur, however, because of the nature of CSMA/CD.

If the network is busy, or a collision occurs, the CSMN/CD algorithm relies on a random backoff algorithm for determining when to make the next attempt at sending the packet. The idea is randomize the interval between when attempts are made to transmit the packets, resulting in a greater probability of no collisions. However, if a NIC is attempting to transmit an on-demand packet, and the slot has other nodes contending for it, the NIC may hold the packet past the start time of the next scheduled packet, resulting in a schedule violation.

It is now clear that use of the TIMEOUT register in the NIC (refer again to FIG. 3) allows the NIC software driver to manage this problem. When scheduling an asynchronous packet, the driver sets a timeout value that is equal to the time for the next on-demand packet to be sent less the time it takes to transmit the packet. This insures that either: a) the packet was sent, and the NIC is ready for the next streaming media packet; or b) the packet is timed out properly, and the NIC is again ready for the next streaming media packet. It is necessary that the transmission time of the packet be allowed for during scheduling because it is not possible for a packet which has begun transmission to be canceled. Leaving this buffer insures that NIC is always finished with the previous operation before encountering the streaming media packet.

Discovery and Fault Recovery

Networks are seldom static, and it is expected that nodes come and go over time for various reasons, such as node failure or power failure. Discovery and initialization of new devices, and cleanup from device failure are the two areas of interest in this domain. Failures of the transmission media (such as accidentally cutting a wire carrying network transmissions) must be resolved externally to the system described here. The following unique and novel methods are described which handle these issues.

When a device 15 is first connected to the network 10, it awaits the periodic broadcast of the network synchronization clock 62. An implicit window for on-demand transmission is reserved immediately succeeding this clock, and the new node 15 contends for this slot in order to broadcast a request for download of the current schedule 61. If it cannot successfully send the packet in this window, it awaits the next clock broadcast. The node 14 providing the network synchronization clock broadcast is responsible for responding to the download request with an on demand transmission of the current schedule 62. Once the schedule 62 is received, the new node 15 is permitted to begin regular operation, typically by broadcasting an on-demand packet identifying itself.

The first node to initialize on the network does not receive the periodic clock update. After waiting a specific amount of time, the node may assume that it must take responsibility for broadcasting the periodic network clock, and responding to other devices as they initialize. It also initializes it's schedule to empty. Nodes which join the network later are thus properly initialized.

If the node which is responsible for broadcasting the network clock fails, recovery is handled as follows. Each node continues to follow the transmission schedule, so operation of the network continues properly and transparently. After a certain time, each node recognizes that the broadcast clock has not been received. At the next available opportunity, the nodes broadcast to each other a copy of their local NIC clock register. By definition, some node succeeds in sending it's clock first. A feature of this method is that each node ignores such broadcasts unless they originate at the assumed clock node or the clock timeout has occurred. The first successful clock broadcast after the previous clock node failed resets this timeout value and indicates the clock node, causing succeeding clock broadcasts from other nodes to be ignored.

All devices which can stream data use this method to detect device (or network) failures: during the life of the stream, the receiver is responsible for broadcasting periodic on-demand packets indicating it's continued interest in receiving the stream. All nodes on the network use these packets to reset an internal countdown timer to a preferred value. If this timer goes to zero, each node assumes that the receiver has failed or become inaccessible, and releases the allocation record associated with that stream. The sender also ceases sending the streaming data. This scheme insures that the network capacity represented by the stream is properly recovered, even if both the sender and receiver fail.

Detection of node failure when a node is solely sending or receiving on-demand packets is not dealt with at this level. It is assumed that higher-level software properly detects and recovers from attempts to communicate with failed nodes.

Scheduling Network Transmissions

A unique feature of this method is that reservation of network capacity is completely independent of continuing proper operation of nodes on the network. In fact, there is no requirement for a central network controller of any kind, resulting in a self-managed network of nodes.

The nodes on the network rely on a peer-to-peer broadcast protocol for managing reservations. The methods described here provide for a great improvement over existing reservation methods, such as those described in the previously mentioned U.S. Pat. Nos. 5,295,140 and 5,012,469. This improvement in existing methods is possible because each node contains within it a copy of the entire schedule, and this schedule is synchronized across all nodes by the periodic network clock broadcast.

When a node desires to reserve an allocation record for transmitting streaming media, it examines it's copy of the schedule and chooses an appropriate time for the first transmission. During the next available on-demand window it broadcasts an allocation message to all nodes.

When each node (including the node requesting the allocation) receives the broadcast, it attempts to update it's schedule. If a previously scheduled streaming media transmission conflicts with the new allocation, the new request is ignored. This method insures that the in the case of simultaneous allocation requests that only one request succeeds because the broadcast nature of the transaction assures that the requests are serialized. After broadcasting a request, the requesting node checks its copy of the schedule to see if the request is present. If so, the request succeeded, and the node may begin transmitting the streaming media according to the schedule. Otherwise, the node must choose a new position in the schedule and broadcast a new request for it.

AN ALTERNATIVE EMBODIMENT OF THE INVENTION

With respect to the interface between the Network Interface Component (NIC) and software, there is an alternative embodiment of the invention that avoids requiring any changes to NIC behavior. It assumes that the NIC can be operated in a direct mode, i.e. that commands may be explicitly given to the NIC to transmit a packet or cancel a packet. Thus, the typical ring-buffer structure which allows semi-autonomous operation by the NIC is bypassed. Nearly all NIC interfaces support such operation for diagnostic or real-time control purposes, of which the alternative embodiment is an example.

A ring-buffer structure is typically used to provide a level of decoupling between NIC operation and host processing, which can increase performance by allowing parallel operation of the NIC and the host, and reduces host load by requiring less processing for each packet sent or received. In many instances, especially for lower-cost devices which are dedicated to particular tasks, employing a ringbuffer structure has no advantage over direct management of packet transmission by a separate controller. This leads to the alternative embodiment.

The trade-off versus the preferred embodiment is that such direct management of the NIC necessarily increases the overhead costs in software drivers, and reduces the accuracy for scheduling transmissions by the time taken for such overhead. Additional loss of accuracy occurs during interrupt handling, where actual dispatching of the software interrupt routines is delayed due to other active tasks.

In the context of the transmission schedule, such overhead reduces the scheduling resolution which can be achieved. For example, a NIC enhanced with the preferred embodiment has a resolution equivalent to that of the continuous counter in the preferred embodiment. To guarantee correct operation of all devices, the effective resolution of the counter must be reduced to that of the slowest responding device on the network.

As an example, consider a shared network using a basic clock resolution of one microsecond. The slowest controller on the network implements the software method described below, where interrupt latency is <=10 us. To assure proper operation, each node schedules packets assuming a 1 us counter, but all values are rounded up to the nearest 10 us. This technique is referred to as padding the schedule. The drawback of padding is that it causes additional idle time on the network because the network is unused during these times, lowering overall efficiency.

Another way to think about the effects of clock resolution is to view use of the shared network as being divided into fixed-size slots, the slot size being determined by the clock resolution. Padding the schedule increases the slot size, and thus decreases efficiency because it becomes harder to fill each slot with valid data. All features of the preferred embodiment which are unique and novel above prior art are maintained in this alternative method, at a loss of network efficiency and throughput.

A software driver is assumed which has access to a high-precision clock which can be used to trigger an interrupt.

As in the preferred embodiment, the schedule for the shared network is followed by this driver. Algorithmically, the driver does as follows:

```
NIC_Transmit_Interrupt() {
    Mark current packet done, reschedule if appropriate;
    Fetch next packet in schedule;
        if (packet is not to be transmitted) {
            calculate clock offset to packet timeout value;
            set timer to interrupt controller at (now + offset);
            return;
        }
        if (packet is streaming data) {
            calculate clock offset to packet transmit time;
            set timer to interrupt controller at (now + offset);
            return;
        }
        /* must be an on-demand packet */
        if (timeout for contention) {
            calculate clock offset to packet timeout value;
            set timer to interrupt controller at (now + offset);
        }
        instruct NIC to transmit packet;
}

Timer_Interrupt_SendNow {
    /* called for streaming data packet */
    instruct NIC to transmit packet;
}

Timer_Interrupt_Timeout {
    /* called for timeouts */
    cancel NIC packet transmission, if active;
    call NIC_Transmit_Interrupt to simulate NIC completion;
}
```

As an example, consider a software driver installed within a desktop operating system, such as Windows 95. Timer interrupt accuracy is 10 milliseconds, implying that there are 100 slots available. On a 10 Mbit/sec network, it is possible to send approximately 10 Kbytes of data every 10 milliseconds. If a packet is only 1 Kbyte in length, then 90% of the capacity of a slot is wasted. An example might be a simple audio playback device that has only a 1 Kbyte buffer to minimize cost, and requires 50 Kbyte/sec of data for uninterrupted playback. This implies 50 of the available 100 slots are only 10% filled, and thus network efficiency overall has been reduced by 45%.

This explains why the apparatus described in the preferred embodiment is unique and novel. If a counter with 1 us resolution is used, then the same 1 Kbyte transmission takes 820 us (less then 1 us/byte), and the next packet can be transmitted immediately afterwards. In the 10 millisecond example above, the network would be idle for 10180 us before the next transmission.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for managing the allocation of data capacity on a physically shared network segment, said method comprising the steps of:
    providing a plurality of devices on said physically shared network segment;
    providing an on-demand packet-based service;
    providing a streaming media service which operates in parallel with said on-demand packet-based service on said network segment; and
    wherein said streaming media service utilizes a distributed reservation scheme to avoid network contention, wherein each device contains within it a copy of the entire reservation schedule and said reservation schedule is synchronized across all devices by a periodic network clock broadcast.

2. An apparatus for managing the allocation of data capacity on a physically shared network segment, comprising:
    a network interface component (NIC) comprising:
        a free-running time-based counter that may be read or modified by a host processor at any time; and
        a first register identical in size to said counter for receiving a host processor-specified value;
        wherein said NIC is required to wait, without accessing a transmission medium, until the value in said first register matches that of said free-running time-based counter; and
        wherein said NIC must transmit said packet when said value in said first register matches that of said free-running time-based counter.

3. The apparatus of claim 2, wherein said NIC marks said packet done but does not transmit said packet, and continues on to a next packet in sequence when said value in said first register matches that of said free-running counter.

4. The apparatus of claim 3, further comprising:
    a second register identical in size to said counter for receiving a host processor-specified value;
    wherein said NIC transmits said packet after waiting a predetermined amount of time, as determined by said host processor-specified value, if said value in said first register matches that of said free-running counter; and
    wherein said NIC ceases attempting to transmit said packet and, optionally, indicates that said packet was not sent, after waiting a predetermined amount of time, as determined by said host processor-specified value, if said value in said first register does not match that of said free-running counter.

5. The apparatus of claim 4, wherein said NIC waits until the value in said second register matches the value of said free running counter, then indicates it has finished with said packet but does not transmit said packet, and continues operation when said value in said first register matches that of said free-running counter.

6. The apparatus of claim 2, wherein said host processor, on demand, may request that a packet which is waiting for transmission be canceled.

7. A method for managing the allocation of data capacity on a physically shared network segment, said method comprising the steps of:
    computing a distributed network schedule for a transmission medium indicating when various network devices are permitted to transmit on said medium; and indicating unscheduled portions of network bandwidth which are contended for by said network devices;
    wherein each node on said network maintains a representation of said distributed network schedule locally;
    wherein network contention is substantially eliminated during periods where scheduled transmissions are taking place; and
    wherein limited contention is allowed for unscheduled portions of said bandwidth, with the ability to stop contention in time for a next scheduled transmission.

8. The method of claim 7, further comprising the steps of:
    determining the time it takes to transmit a block of X bytes between two nodes by calculating the achievable bandwidth between those nodes and the size of the block to be transmitted; and
    scheduling the use of said transmission medium based on the time it takes for each transmission if an arbitrary scheduling interval is chosen, regardless of the available bandwidth between any two nodes.

9. The method of claim 7, wherein each node is responsible for setting a free-running counter in a network interface component (NIC) with a network-relative clock value which is periodically broadcast by a selected node;
    wherein each node contains within it a copy of said schedule which is synchronized across all nodes by said periodic network-relative clock broadcast.

10. The method of claim 9, wherein each scheduled block of time is represented by an allocation record which contains fields describing said network-relative clock value at which said block begins, the duration of time represented by said block, and the re-scheduling period, for continuous, constant-rate streams of data.

11. The method of claim 10, further comprising the step of:
    reinserting said block at an appropriate point in said schedule for sending as a next block of data when a scheduled block transmission is completed when said block represents a constant-rate stream of data.

12. The method of claim 10, wherein allocation records are set up or torn down in every node on said network with a single transmission.

13. The method of claim 10, further comprising the steps of:
    performing an appropriate operation on a local copy of said schedule when a node receives an allocation message;
    allocating a dead-space record which indicates to said node that it is not to transmit during that period if said node is not sending a stream of data.

14. The method of claim 10, further comprising the steps of:
    combining a buffer and an allocation record into a single data structure; and
    using said ring-buffer to hold said schedule.

15. A method for combining time-sensitive transmission with on-demand data transmission, such that packets involved in synchronous data transmissions are unaffected by other traffic, said method comprising the steps of:
    computing a schedule for a transmission medium indicating when various network devices are permitted to transmit on said medium;

indicating unscheduled portions of network bandwidth which are contended for by said network devices;

wherein each network device on the network maintains a representation of said schedule locally;

scanning a local copy of said schedule with a network interface component (NIC) when a NIC driver on a particular node is presented with a packet to be sent; and inserting said packet into a first unscheduled space in said schedule large enough to hold said packet.

16. The method of claim 15, wherein a streaming media packet is scheduled into said first unscheduled space if a conflict occurs between streaming media and an on-demand packet; and wherein a previously scheduled on-demand packet is deleted from said schedule and re-inserted in a first available slot, said on-demand packet having been replaced in said schedule by said streaming media packet.

17. The method of claim 16, further comprising the step of:

reserving on-demand transmission space.

18. The method of claim 16, further comprising the step of:

using a timeout register having a set timeout value that is equal to the time for a next on-demand packet to be sent less the time it takes to transmit said packet.

19. A method for managing the allocation of data capacity on a physically shared network segment, said method comprising the steps of:

computing a schedule for a transmission medium indicating blocks of time when various network devices are permitted to transmit on said medium, wherein each scheduled block of time is represented by an allocation record, and wherein each node contains within it a copy of said schedule which is synchronized across all nodes by a periodic network-relative clock broadcast;

reserving an implicit window for on-demand transmission immediately succeeding a periodic broadcast of said network relative clock value when a node is first connected to said network to broadcast a request for download of a current schedule;

awaiting a next clock broadcast if said node cannot successfully send a packet in said window;

responding to said download request from said broadcast node with an on-demand transmission of said current schedule; and beginning regular operation at said node once said schedule is received.

20. The method of claim 19, wherein a first node to initialize on said network does not receive said periodic broadcast of said network relative clock;

wherein said node takes responsibility for broadcasting said network relative clock after waiting a predetermined amount of time;

wherein said node responds to other nodes as they initialize; and wherein said nodes initializes it's schedule to empty, such that nodes which join said network later are properly initialized.

21. The method of claim 19, wherein each node continues to follow said transmission schedule if the node which is responsible for broadcasting said network relative clock fails;

wherein each node recognizes that said network relative clock has not been received after a predetermined time;

wherein said nodes broadcast to each other a copy of a local clock register at a next available opportunity; and wherein a first successful clock broadcast after said previous clock node failed resets a timeout value and indicates a clock node, causing succeeding clock broadcasts from other nodes to be ignored.

22. The method of claim 19, wherein a receiver node is responsible for broadcasting periodic on-demand packets indicating it's continued interest in receiving a stream during the life of said stream;

wherein all nodes on said network use said packets to reset an internal count-down timer to a preferred value; where each node assumes that said receiver node has failed or become inaccessible and releases an allocation record associated with said stream if said timer goes to zero; and wherein a sender node ceases sending said streaming data, such that network capacity represented by said stream is properly recovered, even if both a sender and receiver fail.

23. The method of claim 19, wherein a node examines it's copy of said schedule and chooses an appropriate time for a first transmission when said node desires to reserve an allocation record for transmitting streaming media; and wherein said node broadcasts an allocation message to all nodes during a next available on-demand window.

24. The method of claim 23, wherein each node, including a node requesting an allocation, attempts to update it's schedule when it receives an allocation message broadcast;

wherein a new allocation request is ignored if a previously scheduled streaming media transmission conflicts with said new allocation request;

wherein a requesting node checks its copy of said schedule to see if said request is present after broadcasting;

wherein said requesting node may begin transmitting streaming media according to said schedule if said request succeeds; and wherein said node must choose a new position in said schedule and broadcast a new request for it if said request did not succeed.

25. An apparatus for managing the allocation of data capacity on a physically shared network segment, comprising:

a network interface component (NIC) comprising:

a free-running time-based counter that may be read or modified by a host processor at any time; and a first register identical in size to said counter for receiving a host processor-specified value;

wherein said NIC is required to wait, without accessing a transmission medium, until the value in said first register matches that of said free-running time-based counter;

wherein said NIC must transmit said packet when said value in said first register matches that of said free-running time-based counter; and wherein commands are explicitly given to said NIC to transmit a packet or to cancel a packet.

26. An apparatus for managing the allocation of data capacity on a physically shared network segment, comprising:

a plurality of devices on said physically shared network segment;

an on-demand packet-based service;

a streaming media service which operates in parallel with said on-demand packet-based service on said network segment; and wherein said streaming media service utilizes a distributed reservation scheme to avoid network contention, wherein each device contains within it a copy of the entire reservation schedule and said reservation schedule is synchronized across all devices by a periodic network clock broadcast.

27. A method for managing the allocation of data capacity on a physically shared network segment, comprising the step of:
  providing a network interface component (NIC) comprising:
    a free-running time-based counter that may be read or modified by a host processor at any time; and
    providing a first register identical in size to said counter for receiving a host processor-specified value;
  wherein said NIC is required to wait, without accessing a transmission medium, until the value in said first register matches that of said free-running time-based counter; and
    wherein said NIC must transmit said packet when said value in said first register matches that of said free-running time-based counter.

28. The method of claim 27, wherein said NIC marks said packet done but does not transmit said packet, and continues on to a next packet in sequence when said value in said first register matches that of said free-running counter.

29. The method of claim 28, further comprising the step of:
  providing a second register identical in size to said counter for receiving a host processor-specified value;
  wherein said NIC transmits said packet after waiting a predetermined amount of time, as determined by said host processor-specified value, if said value in said first register matches that of said free-running counter; and
  wherein said NIC ceases attempting to transmit said packet and, optionally, indicates that said packet was not sent, after waiting a predetermined amount of time, as determined by said host processor-specified value, if said value in said first register does not match that of said free-running counter.

30. The method of claim 29, wherein said NIC waits until the value in said second register matches the value of said free running counter, then indicates it has finished with said packet but does not transmit said packet, and continues operation when said value in said first register matches that of said free-running counter.

31. The method of claim 27, wherein said host processor, on demand, may request that a packet which is waiting for transmission be canceled.

32. An apparatus for managing the allocation of data capacity on a physically shared network segment, comprising:
  a network interface component (NIC) for computing a distributed network schedule for a transmission medium indicating when various network devices are permitted to transmit on said medium; and
  a mechanism that identifies unscheduled portions of network bandwidth which are contended for by said network devices;
  wherein each node on said network maintains a representation of said distributed network schedule locally;
  wherein network contention is substantially eliminated during periods where scheduled transmissions are taking place; and
  wherein limited contention is allowed for unscheduled portions of said bandwidth, with the ability to stop contention in time for a next scheduled transmission.

33. The apparatus of claim 32, further comprising:
  a timer for determining the time it takes to transmit a block of X bytes between two nodes by calculating the achievable bandwidth between those nodes and the size of the block to be transmitted; and
  wherein the use of said transmission medium is scheduled based on the time it takes for each transmission if an arbitrary scheduling interval is chosen, regardless of the available bandwidth between any two nodes.

34. The apparatus of claim 33, wherein each node is responsible for setting a free-running counter in a network interface component (NIC) with a network-relative clock value which is periodically broadcast by a selected node;
  wherein each node contains within it a copy of said schedule which is synchronized across all nodes by said periodic network-relative clock broadcast.

35. The apparatus of claim 34, wherein each scheduled block of time is represented by an allocation record which contains fields describing said network-relative clock value at which said block begins, the duration of time represented by said block, and the re-scheduling period, for continuous, constant-rate streams of data.

36. The apparatus of claim 34, further comprising:
  a mechanism for reinserting said block at an appropriate point in said schedule for sending as a next block of data when a scheduled block transmission is completed when said block represents a constant-rate stream of data.

37. The apparatus of claim 35, wherein allocation records are set up or torn down in every node on said network with a single transmission.

38. The apparatus of claim 35, further comprising:
  a mechanism for performing an appropriate operation on a local copy of said schedule when a node receives an allocation message;
  a mechanism allocating a dead-space record which indicates to said node that it is not to transmit during that period if said node is not sending a stream of data.

39. The apparatus of claim 35, further comprising:
  a buffer and an allocation record that are combined into a single data structure;
  wherein said ring-buffer is used to hold said schedule.

40. An apparatus for combining time-sensitive transmission with on-demand data transmission, such that packets involved in synchronous data transmissions are unaffected by other traffic, comprising:
  a network interface component (NIC) for computing a schedule for a transmission medium indicating when various network devices are permitted to transmit on said medium;
  means for indicating unscheduled portions of network bandwidth which are contended for by said network devices;
  wherein each network device on the network maintains a representation of said schedule locally;
  means for scanning a local copy of said schedule with a network interface component (NIC) when a NIC driver on a particular node is presented with a packet to be sent; and
  means for inserting said packet into a first unscheduled space in said schedule large enough to hold said packet.

41. The apparatus of claim 40, wherein a streaming media packet is scheduled into said first unscheduled space if a conflict occurs between streaming media and an on-demand packet; and wherein a previously scheduled on-demand packet is deleted from said schedule and re-inserted in a first available slot, said on-demand packet having been replaced in said schedule by said streaming media packet.

42. The apparatus of claim 41, further comprising:

means for reserving on-demand transmission space.

43. The apparatus of claim 41, further comprising:

a timeout register having a set timeout value that is equal to the time for a next on-demand packet to be sent less the time it takes to transmit said packet.

44. An apparatus for managing the allocation of data capacity on a physically shared network segment, comprising:

a network interface component (NIC) for computing a schedule for a transmission medium indicating blocks of time when various network devices are permitted to transmit on said medium, wherein each scheduled block of time is represented by an allocation record, and wherein each node contains within it a copy of said schedule which is synchronized across all nodes by a periodic network-relative clock broadcast;

an implicit window reserved for on-demand transmission immediately succeeding a periodic broadcast of said network relative clock value when a node is first connected to said network to broadcast a request for download of a current schedule;

means for awaiting a next clock broadcast if said node cannot successfully send a packet in said window;

means for responding to said download request from said broadcast node with an on-demand transmission of said current schedule; and means for beginning regular operation at said node once said schedule is received.

45. The apparatus of claim 44, wherein a first node to initialize on said network does not receive said periodic broadcast of said network relative clock;

wherein said node takes responsibility for broadcasting said network relative clock after waiting a predetermined amount of time;

wherein said node responds to other nodes as they initialize; and wherein said nodes initializes it's schedule to empty, such that nodes which join said network later are properly initialized.

46. The apparatus of claim 44, wherein each node continues to follow said transmission schedule if the node which is responsible for broadcasting said network relative clock fails;

wherein each node recognizes that said network relative clock has not been received after a predetermined time;

wherein said nodes broadcast to each other a copy of a local clock register at a next available opportunity; and wherein a first successful clock broadcast after said previous clock node failed resets a timeout value and indicates a clock node, causing succeeding clock broadcasts from other nodes to be ignored.

47. The apparatus of claim 44, wherein a receiver node is responsible for broadcasting periodic on-demand packets indicating it's continued interest in receiving a stream during the life of said stream;

wherein all nodes on said network use said packets to reset an internal count-down timer to a preferred value; where each node assumes that said receiver node has failed or become inaccessible and releases an allocation record associated with said stream if said timer goes to zero; and wherein a sender node ceases sending said streaming data, such that network capacity represented by said stream is properly recovered, even if both a sender and receiver fail.

48. The apparatus of claim 44, wherein a node examines it's copy of said schedule and chooses an appropriate time for a first transmission when said node desires to reserve an allocation record for transmitting streaming media; and wherein said node broadcasts an allocation message to all nodes during a next available on-demand window.

49. The apparatus of claim 48, wherein each node, including a node requesting an allocation, attempts to update it's schedule when it receives an allocation message broadcast;

wherein a new allocation request is ignored if a previously scheduled streaming media transmission conflicts with said new allocation request;

wherein a requesting node checks its copy of said schedule to see if said request is present after broadcasting;

wherein said requesting node may begin transmitting streaming media according to said schedule if said request succeeds; and wherein said node must choose a new position in said schedule and broadcast a new request for it if said request did not succeed.

50. A method for managing the allocation of data capacity on a physically shared network segment, comprising these steps of:

providing a network interface component (NIC) comprising:

a free-running time-based counter that may be read or modified by a host processor at any time; and providing a first register identical in size to said counter for receiving a host processor-specified value;

wherein said NIC is required to wait, without accessing a transmission medium, until the value in said first register matches that of said free-running time-based counter; wherein said NIC must transmit said packet when said value in said first register matches that of said free-running time-based counter; and wherein commands are explicitly given to said NIC to transmit a packet or to cancel a packet.

51. The method of claim 19, wherein said node broadcasts an on-demand packet identifying itself.

52. The apparatus of claim 19, wherein said node broadcasts an on-demand packet identifying itself.

* * * * *